United States Patent
Seto et al.

(10) Patent No.: US 7,393,802 B2
(45) Date of Patent: *__Jul. 1, 2008__

(54) ULTRAVIOLET/INFRARED ABSORBENT LOW TRANSMITTANCE GLASS

(75) Inventors: Hiromitsu Seto, Osaka (JP); Yukihito Nagashima, Osaka (JP); Isamu Kuroda, Osaka (JP); Shigekazu Yoshii, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 870 days.

This patent is subject to a terminal disclaimer.

(21) Appl. No.: 10/800,663

(22) Filed: Mar. 16, 2004

(65) Prior Publication Data

US 2004/0186002 A1 Sep. 23, 2004

Related U.S. Application Data

(63) Continuation-in-part of application No. 10/131,237, filed on Apr. 25, 2002, now abandoned, which is a continuation-in-part of application No. 09/524,589, filed on Mar. 14, 2000, now Pat. No. 6,395,660, which is a continuation-in-part of application No. 09/189,638, filed on Nov. 10, 1998, now abandoned, which is a continuation-in-part of application No. 08/909,728, filed on Aug. 12, 1997, now abandoned.

(30) Foreign Application Priority Data

| Aug. 21, 1996 | (JP) | ................................. 8-219616 |
| Jul. 11, 1997 | (JP) | ................................. 9-186374 |

(51) Int. Cl.
*C03C 3/087* (2006.01)

(52) U.S. Cl. ............................ 501/71; 501/70; 501/904; 501/905

(58) Field of Classification Search ................. 501/70, 501/71, 904, 905
See application file for complete search history.

(56) References Cited

U.S. PATENT DOCUMENTS

| 5,837,629 | A | * | 11/1998 | Combes et al. ............... 501/70 |
| 6,150,028 | A | * | 11/2000 | Mazon ....................... 428/426 |
| 6,287,998 | B1 | * | 9/2001 | Seto et al. ..................... 501/71 |
| 6,333,287 | B1 | * | 12/2001 | Seto ............................ 501/70 |
| 6,395,660 | B1 | * | 5/2002 | Seto et al. ..................... 501/71 |
| 6,436,860 | B2 | * | 8/2002 | Seto et al. ..................... 501/71 |
| 6,455,452 | B1 | * | 9/2002 | Krumwiede ................. 501/71 |
| 6,506,700 | B1 | * | 1/2003 | Combes et al. ............... 501/70 |
| 6,524,713 | B2 | * | 2/2003 | Seto et al. ................... 428/426 |
| 6,753,280 | B2 | * | 6/2004 | Seto et al. ..................... 501/70 |
| 6,841,494 | B2 | * | 1/2005 | Seto et al. ..................... 501/70 |
| 2002/0155939 | A1 | * | 10/2002 | Seto et al. ..................... 501/71 |

* cited by examiner

*Primary Examiner*—Jerry A. Lorengo
*Assistant Examiner*—Elizabeth A Bolden
(74) *Attorney, Agent, or Firm*—Manabu Kanesaka

(57) ABSTRACT

An ultraviolet/infrared absorbent low transmittance glass is formed of base glass containing 65 to 80 wt. % $SiO_2$; 0 to 5 wt. % $Al_2O_3$; greater than 2.1 to less than or equal to 10 wt. % MgO; 5 to 15 wt. % CaO wherein a total amount of MgO and CaO is 7 to 15 wt. %; 10 to 18 wt. % $Na_2O$; 0 to 5 wt. % $K_2O$ wherein a total amount of $Na_2O$ and $K_2O$ is 10 to 20 wt. %; and 0 to 5 wt. % $B_2O_3$, and colorants including 1.25 to 2.2 wt. % total iron oxide (T-$Fe_2O_3$) expressed as $Fe_2O_3$; 0.001 to 0.018 wt. % CoO; 0 to 0.0004 wt. % Se; and 0.028 to 0.2 wt. % NiO, wherein the glass has a turquoise blue or deep green color.

20 Claims, 1 Drawing Sheet

ULTRAVIOLET/INFRARED ABSORBENT LOW TRANSMITTANCE GLASS

CROSS REFERENCE TO RELATED APPLICATION

This is a continuation-in-part application of a patent application Ser. No. 10/131,237 filed on Apr. 25, 2002, now abandoned which is a continuation-in-part application Ser. No. 09/524,589 filed on Mar. 14, 2000, now U.S. Pat. No. 6,395,660, which is a continuation-in-part application Ser. No. 09/189,638 filed on Nov. 10, 1998, now abandoned, which is a continuation-in-part application Ser. No. 08/909,728 filed on Aug. 12, 1997, now abandoned.

BACKGROUND OF THE INVENTION AND RELATED ART STATEMENT

The present invention relates to an ultraviolet/infrared absorbent low transmittance glass. More particularly, it relates to an ultraviolet/infrared absorbent low transmittance glass which has an almost neutral color such as turquoise blue shade and deep green shade so that it is useful for windows of vehicles or buildings when used in combination with a glass having green shade with high visible light transmittance, and which has low or middle visible light transmittance, low total solar energy transmittance, and low ultraviolet transmittance so that it is suitable for use as privacy glazing in a vehicle.

Recently, a variety of glasses with ultraviolet/infrared absorbability to be used as a vehicle windshield have been proposed with the view of preventing degradation of luxurious interior materials and reducing cooling load of the vehicle. In view of privacy protection, glass with relatively low visible light transmittance is preferably used for a rear window glass of a vehicle. Such kinds of glass include the followings.

For example, a dark gray colored infrared absorbent glass disclosed in Japanese Patent Publication No. 7-29813 consists of soda-lime-silica glass including colorants consisting of 1.00 to 1.7 weight percent, $Fe_2O_3$ (total iron), at least 0.27 weight percent FeO, 0.002 to 0.005 weight percent Se, and 0.01 to 0.02 weight percent CoO. The glass exhibits luminous transmittance less than 32 percent and total solar infrared transmittance less than 15 percent at 3.9 mm thickness.

A dark gray colored glass disclosed in Japanese Unexamined Published Patent Application No. 8-157232 consists of soda-lime-silica glass including colorants consisting of 0.8 to 1.4 weight percent $Fe_2O_3$ (total iron), less than 0.21 weight percent FeO, 0.05 to 1.0 weight percent $TiO_2$, 0.02 to 0.05 weight percent CoO, and 0.0005 to 0.015 weight percent Se.

A neutral gray colored glass disclosed in claim 25 of U.S. Pat. No. 5,393,593 has a base glass composition comprising 66 to 75 weight percent $SiO_2$, 10 to 20 weight percent $Na_2O$, 5 to 15 weight percent CaO, 0 to 5 weight percent MgO, 0 to 5 weight percent $Al_2O_3$, and 0 to 5 weight percent $K_2O$, and colorants consisting of 1.00 to 2.2 weight percent $Fe_2O_3$ (total iron), at least 0.20 weight percent FeO, 0.0005 to 0.005 weight percent Se, and 0.010 to 0.030 weight percent CoO. The glass exhibits luminous transmittance less than 35 percent and total solar infrared transmittance less than 20 percent at 3.9 mm thickness.

A soda-lime-silica glass disclosed in Japanese Publication of PCT No. 8-506314 has a neutral color by including primary iron given by the following expression:

FeO (weight percent) ≧ 0.007+(optical concentration−0.036)/2.3 and 0.25 to 1.75 weight percent $Fe_2O_3$ and at least one selected from a group consisting of Se, $Co_3O_4$, $Nd_2O_3$, NiO, MnO, $V_2O_5$, $CeO_2$, $TiO_2$, CuO, and SnO. The glass exhibits luminous transmittance more than 32 percent, ultraviolet transmittance less than 25 percent, direct solar energy transmittance at least 7 percent less than the luminous transmittance, and dominant wavelengths preferably less than 570 nanometers at 4 mm thickness. Certain embodiments thereof may be used as a privacy glazing.

In both the dark gray colored infrared absorbent glass disclosed in Japanese Patent Publication No. 7-29813 and the dark gray colored glass disclosed in Japanese Unexamined Published Patent Application No. 8-157232, a great quantity of Se is used for providing a desirable color. Such a great quantity of Se is unpreferable for the environment because Se has toxicity and is easy to vaporize. The above dark gray glass including 0.05 to 1.0 weight percent $TiO_2$ as an essential component is unpreferable because $TiO_2$ is expensive to increase the batch cost.

The neutral gray colored glass disclosed in U.S. Pat. No. 5,393,593 is also unpreferable because of the great content of Se. The great content of FeO is preferable in view of heat ray absorptivity, FeO is on the contrary not preferable because it selectively absorbs infrared ray in a wavelength from 1,000 to 1,200 nanometers so that in case the glass is produced by a normal melting furnace, it absorbs most efficient portion in flame luminance distribution so as to lower the temperature of bottom base of the furnace and then contribute to various defects.

Though the aforementioned glass with low visible light transmittance is superior in view of privacy protection, an occupant in a vehicle cabin sees outside quite unclearly through the glass. On the other hand, a glass with middle transmittance can be sufficient to some extent for both privacy protection and safety. These types of glass are chosen according to portions in a vehicle and circumferences.

The aforementioned glass includes selenium in high concentration to provide optical properties, without essentially including nickel.

The glass of Japanese Publication PCT No. 8-506314, which can be used for privacy protection, is provided with a neutral color by including colorants consisting all of nickel, selenium, and cobalt, just as described in this specification. However, it is necessary to add a great quantity of Se since the content of nickel is low.

OBJECT AND SUMMARY OF THE INVENTION

It is an object of the present invention to provide an ultraviolet/infra red absorbent low transmittance glass which has an almost neutral color such as turquoise blue and deep green and which has low or middle visible light transmittance, low ultraviolet transmittance, and low total solar energy transmittance.

The ultraviolet/infrared absorbent low transmittance glass of the present invention consists of a base glass, that is, the major constituents comprising:

65 to 80 wt. % $SiO_2$;
0 to 5 wt. % $Al_2O_3$;
greater than 2 to less than or equal to 10 wt. % MgO;
5 to 15 wt. % CaO wherein a total amount of MgO and CaO is 7 to 15 wt. %;
10 to 18 wt. % $Na_2O$;
0 to 5 wt. % $K_2O$ wherein a total amount of $Na_2O$ and $K_2O$ is 10 to 20 wt. %;
0 to 5 wt. % $B_2O_3$, and colorants comprising:

1.25 to 2.2 wt. % total iron oxide (T-$Fe_2O_3$) expressed as $Fe_2O_3$;
0.001 to 0.018 wt. % CoO;
0 to 0.0008 wt. % Se; and
0.028 to 0.2 wt. % NiO.

PREFERRED EMBODIMENTS

Figure 1:
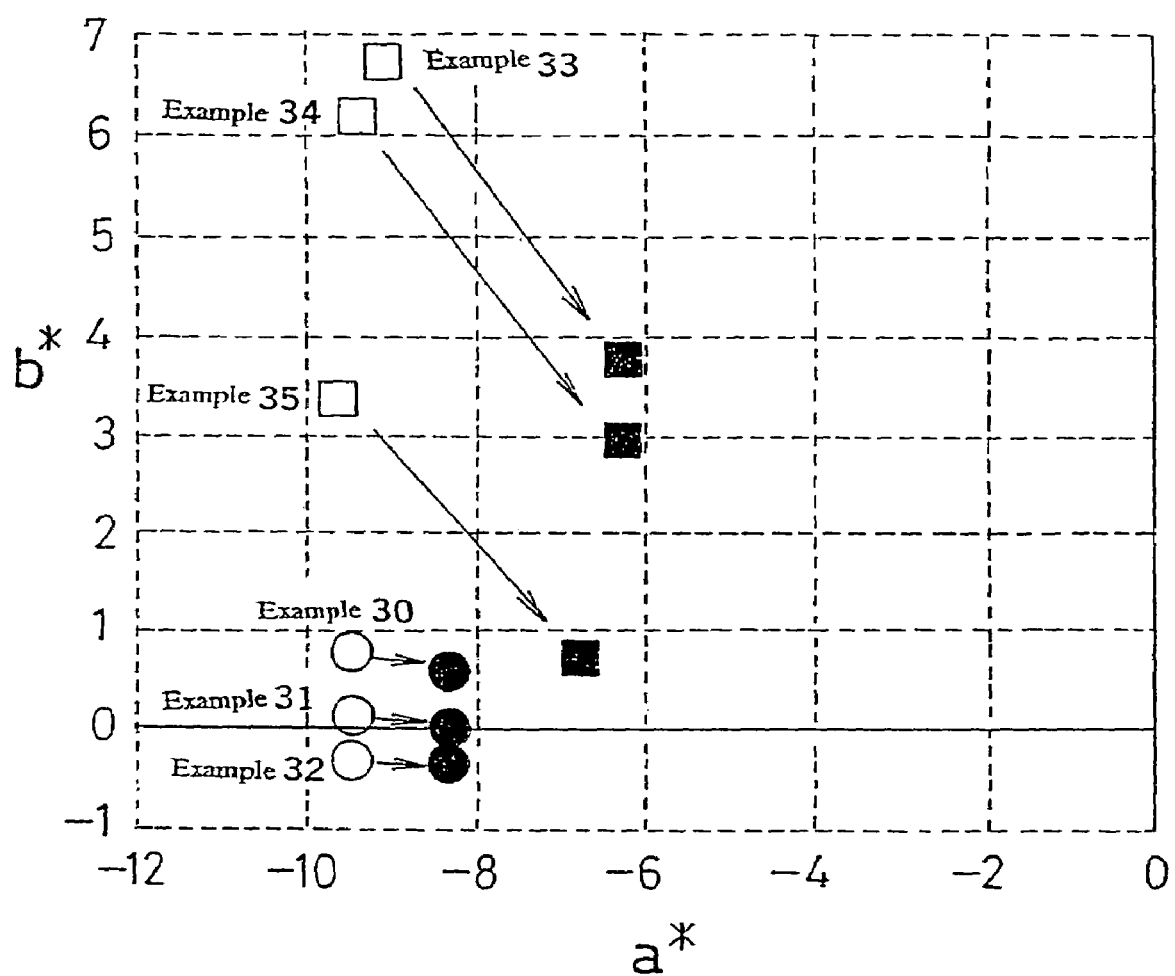
FIG. 1 is a diagram showing changes in color shade during reinforcing process in each example.

The description will be made as regard to an ultraviolet/infrared absorbent low transmittance glass composition. It should be noted that components will be represented with percentage by weight.

$SiO_2$ (silica) is a principal component for forming skeleton of glass. Less than 65% $SiO_2$ lowers the durability of the glass and more than 80% $SiO_2$ raises the melting temperature of the glass so high.

$Al_2O_3$ is a component for improving the durability of the glass. More than 5% $Al_2O_3$ raises the melting temperature of the glass so high. The preferable range of $Al_2O_3$ is between 0.1% and 2%.

MgO and CaO improve the durability of the glass and adjust a devitrification temperature and viscosity of the glass during molding. More than 10% MgO raises the devitrification temperature. Less than 5% or more than 15% CaO raises the devitrification temperature of the glass. The durability of the glass is lowered when the total amount of MgO and CaO is less than 7%, while the devitrification temperature is increased when the total exceeds 15%.

$Na_2O$ and $K_2O$ prompt the glass to melt. The efficiency of promotion of melting becomes poor when $Na_2O$ is less than 10% or the total of $Na_2O$ and $K_2O$ is less than 10%, while the durability of the glass is lowered when $Na_2O$ exceeds 18% or the total of $Na_2O$ and $K_2O$ exceeds 20%. $K_2O$ is preferable not to exceed 5% because of its expensive cost.

$B_2O_3$ is a component for improving the durability of the glass, prompting to melt, and yet enhancing the ultraviolet absorption. $B_2O_3$ should be less than 5%, since the transmittance is reduced also at a visible range so that the color of the glass is easy to tint yellow and difficulties during molding are caused due to the vaporization of $B_2O_3$ when $B_2O_3$ exceeds 5%.

Iron oxide is present in the form of $Fe_2O_3$ and the form of FeO in the glass. $Fe_2O_3$ is a component for improving the ultraviolet absorptivity and FeO is a component for improving the heat ray absorptivity.

When the total amount of iron oxide expressed as $Fe_2O_3$ (T-$Fe_2O_3$) is less than 1.2%, the efficiency of ultraviolet and infrared absorptivity becomes small so as not to provide desired optical properties. On the other hand, when T-$Fe_2O_3$ exceeds 2.2%, there is an unpreferable possibility that the temperature around a crown of a glass melting furnace exceeds its refractory temperature due to absorption of the heat ray by the ferrous oxide. In addition, in case of successively producing glass by a glass melting furnace with T-$Fe_2O_3$ exceeding 2.2%, long time is required to alter a glass composition in the furnace. T-$Fe_2O_3$ content is preferably equal to or more than 1.2% and less than 1.8% (more preferably between 1.25% and 1.35%) or between 1.8% and 2.2%.

Equal to or more than 1.2 and less than 1.8% T-$Fe_2O_3$ can offer advantages of small load to the furnace because the glass composition in the successive glass melting furnace is altered to another composition within a short time. In this case, sufficient efficiency of ultraviolet absorptivity is sometimes not obtained only by iron. However, the efficiency of ultraviolet absorptivity can be improved by adding, for example, $CeO_2$, $TiO_2$ within the range defined by the present invention.

Particularly 1.25% to 1.35% T-$Fe_2O_3$ can offer the aforementioned advantages and sufficient efficiency of ultraviolet absorptivity only by iron.

1.8% to 2.2% T-$Fe_2O_3$ makes the time longer to change the glass composition in the furnace, and the load to the furnace becomes greater. However, great efficiency of ultraviolet absorptivity can be obtained with low batch cost.

$Fe_2O_3$ has a function of particularly increasing the absorptivity in ultraviolet range when glass is reinforced by air blast cooling. This means that the glass of this invention can obtain enough efficiency of ultraviolet absorptivity without using expensive ultraviolet absorbent such as $CeO_2$ and $TiO_2$. When T-$Fe_2O_3$ is in the range mentioned above, the desired color shade of the glass can be obtained after discoloration due to the reinforcement process by air blast cooing.

The ratio (by weight) of FeO/T-$Fe_2O_3$ is preferably between 10% and 40%. When the ratio is less than 10%, enough heat ray absorptivity can not be obtained because of a small amount of FeO.

When the FeO/T-$Fe_2O_3$ ratio exceeds 40%, the visible light transmittance is reduced and the color is of a blue tint. In addition, nickel sulfide particles are sometimes present in the molten glass because of a great quantity of $Fe^{2+}$ having reducing characteristics in the molten glass. The FeO/T-$Fe_2O_3$ ratio exceeding 40% causes streaks with enough silica and causes silica scum. The FeO/T-$Fe_2O_3$ ratio in a range between 10% and 40% brings a green shade which is an almost neutral color having high ultraviolet absorbability and high heat ray absorptivity. In this case, values converted to $Fe_2O_3$ are used for the content of FeO.

CoO is a component for forming an almost neutral color such as turquoise blue shade and deep green shade by cooperating with Se and/or NiO, and $Fe_2O_3$ for controlling the visible light transmittance. Less than 0.001% CoO can not form a desired color shade and makes the visible light transmittance too high. More than 0.03% CoO makes the color of too blue tint and reduces the visible light transmittance. Equal to or less than 0.018% (180 ppm) of CoO makes the color shade of the glass dark green.

Se contributes a pink color, so that it reduces the excitation purity with the aid of a complementary color of CoO. When NiO is included, Se may not be always included. More than 0.0008% Se reduces the visible light transmittance. When using Se, the content thereof is preferably in a range of equal to or less than 0.0008% (8 ppm), more preferably equal to or less than 4 ppm, yet more preferably equal to or less than 2 ppm, most preferably equal to or less than 1 ppm. The more deep color the glass has, the lower its visible light transmittance becomes and the glass generally has the high excitation purity and the strong color impression even in the same color co-ordinate. Se of less than 0.0008% (8 ppm) in the glass decreases the excitation purity of the glass and makes the glass to have a soft color at the same color tone without losing the objective green or blue shade green color of the glass. As mentioned, the desired color shade can be obtained with a significantly smaller amount of Se than the amount conventionally required or without Se.

NiO is a component for controlling the visible light transmittance and for reducing the excitation purity as CoO. When NiO is more than 0.2%, nickel sulfide stones are sometimes present in the product and the visible light transmittance is reduced. In addition, the obtained shade becomes too greenish. The content of NiO is in a range between equal to or more than 0.028% and less than 0.2% preferably in a range between 0.05% and 0.2% for low visible light transmittance.

When the concentration of NiO in the glass is too high, there is a possibility that NiO coagulates to form a nickel sulfide stones. However, when NiO is in the range defined by this invention, the desired color shade can be obtained without producing the nickel sulfide stones.

It is known that the coordination number of NiO varies according to the rate of cooling glass so that the colore of the glass varies. This is because the cooling varies the coordination number of oxide around $Ni^{2+}$ from 6 into 4 and thus varies the optical absorption. The absorption of $Ni^{2+}$ with 6 coordinating atoms exists around 430 nanometers so as to contribute yellow to the glass, while the absorption of $Ni^{2+}$ with 4 coordinating atoms exists from 500 to 640 nanometers. Therefore, the excitation purity would be reduced to obtain the preferable shade by using $Ni^{2+}$ with 4 coordinating atoms. Windshields of a passenger car are normally reinforced by air blast cooling for safety. The reinforcement process by air blast cooling also varies the coloring condition of NiO. In the present invention, the desired color shade can be obtained without adding Se by the discoloration due to the reinforcement process by air blast cooling.

$CeO_2$ is a component for improving the ultraviolet absorptivity and is present in the form of $Ce^{3+}$ or in the form of $Ce^{4+}$ in glass. Particularly, $Ce^{3+}$ is effective in absorbing ultraviolet with less absorptivity in the visible range. In the present invention, oxide of $Ce^{3+}$ is also expressed in terms of $CeO_2$ and is included in the total amount of $CeO_2$.

$TiO_2$ is a component for improving the ultraviolet absorptivity particularly by interaction with FeO. $TiO_2$ can be added to improve the ultraviolet absorptivity within such a range as not to lose the almost neutral color such as turquoise blue shade and deep green shade, or to add a yellow tint in order to obtain the desired color shade. The use of expensive $CeO_2$, $TiO_2$ increases the cost so that it is not preferable to use more than 2% $CeO_2$, $TiO_2$.

One or more than two among MnO, $V_2O_5$, $MoO_3$, CuO, $Cr_2O_3$, and the like may be added as colorant and $SnO_2$ within a rang from 0% to 1% in total may be added as a reducing agent in such a range as not to lose middle transmittance and the almost neutral color such as turquoise blue shade and deep green shade. To further securely prevent the formation of nickel sulfide stones, ZnO may be added in a range from 0 to 1%.

In the present invention, when measured by using C.I.E. standard illuminant "A", the total solar energy transmittance (TG) is preferably lower than the visible light transmittance (YA). It is preferable that YA is in a range from 23 to 50% and TG is in a range from 7 to 35% when the measurement is made based on a glass thickness of 4 mm. More preferably, YA is in a range from 25 to 40% and TG is in a range from 20 to 35%. In case of using L* a* b* color system, the chromaticity, expressed by a* and b*, of the glass color is preferably in ranges of $-9<a^*<-6$ and $-3<b^*<3$, respectively.

In the present invention, the glass preferably has YA between 10% and 25% and TG between 10% and 35% at a thickness from 3.1 to 5 mm. In this case, the chromaticity, expressed by a* and b* under L* a* b* color system, of the glass color is preferably in ranges of $-7<a^*<-2$ and $-3<b^*<7$, respectively.

When measured by using C.I.E. standard illuminant "C" over the wavelength range 380 to 770 nanometers, the glass of the present invention preferably has optical properties with dominant wavelengths in the range of 480 to 580 and excitation purity less than 11%.

The glass of the present invention preferably exhibits ultraviolet transmittance, defined by ISO 9050, less than 6%.

EXAMPLES

Hereinafter, the mode of carrying out the present invention will be described referring to some examples.

Examples 1 through 42

Glass raw material is prepared by adding at least one of a group consisting of ferric oxide, titanium oxide, cerium oxide, cobalt oxide, metallic selenium, and nickel oxide into a standard soda-lime-silica glass batch composition, also adding carbonaceous reducing agent (concretely, coke powder etc.) at a ratio of about 0.01 parts by weight per 100 parts of the glass raw material therein, and mixing them. The glass raw material thus prepared is heated and melted in an electric furnace at 1500° C. for 4 hours. The molten glass is flowed onto a stainless plate and annealed to the room temperature as long as 16 hours to obtain a 6 mm thick glass plate. The glass plate is then polished in such a manner that the thickness reduces to 4 mm to become a sample. Each sample is measured in the visible light transmittance by the C.I.E. illuminant A(YA), the total solar energy transmittance (TG), the ultraviolet transmittance by ISO 9050(TUV), the dominant wavelength by the illuminant C(DW), and the excitation purity (Pe). Before measuring the optical properties, some of the samples are cooled by blasting air after reheating in order to reinforce them.

Tables 1-4 show base glass compositions of the obtained samples, $T\text{-}Fe_2O_3$ concentration, FeO (converted to $Fe_2O_3$)/$T\text{-}Fe_2O_3$ rate, CoO concentration, Se concentration, NiO concentration, $CeO_2$ concentration, and $TiO_2$ concentration. The numerals in Tables are indicated as a percentage of the weight except that CoO concentration, Se concentration, and NiO concentration are expressed in ppm. The percentages of $SiO_2$ are indicated without figures after decimal points because the figures after decimal points are rounded off. Tables 1-4 also show the optical properties of the respective samples.

All of the samples of Examples 1 through 21 are characterized by visible light transmittance (YA) between 23% and 50%, total solar energy transmittance (TG) between 7% and 30%, and ultraviolet transmittance (TUV) less than 6%. These are also characterized by dominant wavelength (DV) measured by using the illuminant C between 480 and 525 nanometers, and excitation purity less than 11%.

It is shown that Examples 2-6, 10, and 11 have the same or improved properties as the glass of Example 1, although these are free of NiO.

The examples 7-9, 12-16 have the same or improved properties as the glass of Example 1, although these are free of Se.

In Examples 2-9, the furnace's load during melting can be reduced because of small amount of $T\text{-}Fe_2O_3$.

Examples 10-16 have improved ultraviolet absorptivity and improved infrared absorptivity because of large amount of $T\text{-}Fe_2O_3$.

In order to enhance the ultraviolet absorptivity, relatively large amount of $TiO_2$ is added in Examples 17-19, and $CeO_2$ is added in Example 20. These examples have large ultraviolet absorptivity without losing the visible light transmittance and total solar ultraviolet transmittance.

Example 21 is added with CuO in order to reduce the total solar ultraviolet transmittance, and can exhibit high infrared absorptivity without losing the visible light transmittance and the ultraviolet absorptivity.

Examples 6, 7, and 14 have high visible light transmittance while having high infrared absorptivity and yet have high ultraviolet absorptivity so that these are superior in prevention of degradation of interior materials and reduction of cooling load of the vehicle. Therefore, these are suitable for the privacy protection type of visible light transmission glass, for example, rear windows of vehicles, windows of buildings, and the like.

The ultraviolet absorptivity and the infrared absorptivity of Examples 22-29 are slightly small. These samples contain smaller amount of T-$Fe_2O_3$ and the FeO/T-$Fe_2O_3$ ratio is set relatively low, so that they are superior in productivity.

Among these examples, Examples 23-29 have the same or improved properties as the glass of other examples, although these are free of Se.

Example 25 exhibits middle visible light transmittance and low infrared/ultraviolet transmittance.

Examples 26, 28, and 29 exhibit low visible light transmittance and low infrared/ultraviolet transmittance.

Examples 30-35 and 38 show results of measuring optical properties before and after the reinforcement process by air blast cooling.

Among these examples, Examples 30-32 exhibit middle visible light transmittance and low infrared/ultraviolet transmittance and have an almost neutral color such as turquoise blue shade and deep green shade. The ultraviolet transmittance is improved about 1.5% by the reinforcement process.

Examples 33-35 exhibit low visible light transmittance and low infrared/ultraviolet transmittance. The ultraviolet transmittance is improved about 2% by the reinforcement process.

Each of Examples 30-35 has a preferable color shade which is an almost neutral color of gray tint through the reinforcement process. FIG. 1 shows a coordinate diagram of colors indicated by a*, b* for illustrating how points are moved by the reinforcement process in the aforementioned examples.

It would be apparent from the diagram that all of the points move toward the origin according to the reinforcement process so that the colors become closer to the desired color shade, i.e. almost neutral colors having reduced excitation purity.

Therefore, when the glass compositions of the examples mentioned above are used for windshields of vehicles and windows of building, good effects of preventing degradation of interior materials and of privacy protecting can be expected.

Comparative Examples 1-4

Table 5 shows glass components and optical properties of Comparative Examples which are made in the same manner as Examples 1-35 but the glass components are different.

All of Comparative Examples 1-4 have components out of the range of the present invention. Comparative Example 1 contains NiO as a colorant, an amount of which is out of the claimed range, and Comparative Example 2 contains T-$Fe_2O_3$, an amount of which is out of the claimed range. Comparative Example 3 has the same components as the example of Japanese Unexamined Published Patent Application No. H8-157232 as referred above and Comparative Example 4 has the same components as the example of U.S. Pat. No. 5,393,593 as referred above. It should be noted that the optical properties of Comparative Example 3 are indicated in values converted based on a glass thickness of 5 mm and the optical properties of Comparative Example 4 are indicated in values converted based on a glass thickness of 3.9 mm.

It would be apparent from Table 5 that as compared with the examples of the present invention, Comparative Examples 1 and 2 do not have an almost neutral color such as turquoise blue shade and deep green shade and yet do not exhibit low or middle visible light transmittance, low infrared transmittance, and low ultraviolet transmittance. Comparative Examples 3 and 4 are not preferable in view of productivity and environment because a large amount of expensive and poisonous Se is used therein.

Examples 36, 37, Comparative Example 5

Table 6 shows glass components and optical properties of Examples 36, 37 and Comparative Example 5 which are made in the same manner as Examples 1-35 except the glass components are different.

As shown in Table 6, Se in the glass with a very small amount decreases remarkably an excitation purity of the glass, while changing scarecely a color tone of the glass. More than 2 ppm of Se in the glass changes the color tone of the glass remarkably from green to green shade brown or green shade gray.

As detailed above, according to the present invention, an ultraviolet/infrared absorbent low transmittance glass, which exhibits low or middle visible light transmittance, low total solar energy transmittance, and low ultraviolet transmittance and which has an almost neutral color such as turquoise and deep green, can be provided.

The ultraviolet/infrared absorbent low transmittance glass having the almost neutral color such as turquoise and deep green can exhibit the effect of preventing degradation and discoloration of interior materials and the privacy protecting effect when the glass is used for a rear window glass of a vehicle, a window of a building, or the like.

The specification refers to the disclosure of application Ser. No. 909,728 filed on Aug. 12, 1997abandoned, Ser. No. 189, 638 filed on Nov. 10, 1998, abandoned, and Ser. No. 09/524, 589 filed on Mar. 14, 2000.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 11 | 12 |
| $SiO_2$ | 71 | 71 | 71 | 71 | 71 | 71 | 71 | 71 | 71 | 71 | 71 |
| $Al_2O_3$ | 1.6 | 1.6 | 1.6 | 1.6 | 1.6 | 1.6 | 1.6 | 1.6 | 1.6 | 1.6 | 1.6 |
| MgO | 3.6 | 3.6 | 3.6 | 3.6 | 3.6 | 3.6 | 3.6 | 3.6 | 3.6 | 3.6 | 3.6 |
| CaO | 7.7 | 7.7 | 7.7 | 8.4 | 7.7 | 7.7 | 7.7 | 7.7 | 7.7 | 7.7 | 7.7 |
| $Na_2O$ | 13.7 | 13.7 | 13.7 | 13.1 | 13.7 | 13.7 | 13.7 | 13.7 | 13.7 | 13.7 | 13.7 |
| $K_2O$ | 0.9 | 0.9 | 0.9 | 0.9 | 0.9 | 0.9 | 0.9 | 0.9 | 0.9 | 0.9 | 0.9 |
| $B_2O_3$ | — | 0.2 | — | — | — | — | — | — | — | — | — |
| T-$Fe_2O_3$ | 1.9 | 1.3 | 1.7 | 1.5 | 1.4 | 1.4 | 1.7 | 1.5 | 1.4 | 1.9 | 1.8 |

TABLE 1-continued

|  | Example | | | | | | | | | | |
|---|---|---|---|---|---|---|---|---|---|---|---|
|  | 1 | 2 | 3 | 4 | 5 | 6 | 7 | 8 | 9 | 11 | 12 |
| FeO/T-Fe$_2$O$_3$ | 0.24 | 0.28 | 0.24 | 0.24 | 0.25 | 0.27 | 0.26 | 0.24 | 0.26 | 0.20 | 0.23 |
| CeO$_2$ | — | — | — | — | — | — | — | — | — | — | — |
| TiO$_2$ | 0.03 | 0.03 | 0.03 | 0.03 | 0.03 | 0.03 | 0.03 | 0.03 | 0.03 | 0.03 | 0.03 |
| Se(ppm) | 3 | 5 | 2 | 3 | 4 | 3 | — | — | — | 3 | 1 |
| CoO(ppm) | 100 | 95 | 113 | 107 | 101 | 92 | 94 | 96 | 98 | 125 | 119 |
| NiO(ppm) | 30 | — | — | — | — | — | 150 | 200 | 250 | — | — |
| YA | 30.8 | 38.2 | 34.1 | 35.1 | 37.0 | 36.2 | 35.4 | 38.2 | 37.5 | 33.1 | 32.9 |
| TG | 18.7 | 23.5 | 20.6 | 21.7 | 23.3 | 20.0 | 19.7 | 23.4 | 23.3 | 20.6 | 19.5 |
| Tuv(ISO) | 1.9 | 5.7 | 2.8 | 3.4 | 4.4 | 5.1 | 3.0 | 4.6 | 5.5 | 1.7 | 2.1 |
| dominant wavelength Dw | 519 | 492 | 494 | 496 | 495 | 498 | 499 | 498 | 497 | 499 | 495 |
| excitation purity Pe | 4.5 | 7.4 | 7.7 | 5.9 | 6.0 | 7.1 | 6.8 | 6.7 | 6.8 | 6.2 | 8.2 |

TABLE 2

|  | Example | | | | | | | | | |
|---|---|---|---|---|---|---|---|---|---|---|
|  | 12 | 13 | 14 | 15 | 16 | 17 | 18 | 19 | 20 | 21 |
| SiO$_2$ | 70 | 70 | 70 | 70 | 70 | 71 | 71 | 69 | 70 | 71 |
| Al$_2$O$_3$ | 1.6 | 1.6 | 1.6 | 1.6 | 1.6 | 1.6 | 1.6 | 1.6 | 1.6 | 1.6 |
| MgO | 3.6 | 3.6 | 3.6 | 3.6 | 3.6 | 3.6 | 3.6 | 3.6 | 3.6 | 3.6 |
| CaO | 7.7 | 8.4 | 8.4 | 8.4 | 8.4 | 8.4 | 8.4 | 7.7 | 8.4 | 7.7 |
| Na$_2$O | 13.7 | 13.1 | 13.1 | 13.1 | 13.1 | 13.1 | 13.1 | 13.7 | 13.1 | 13.7 |
| K$_2$O | 0.9 | 0.9 | 0.9 | 0.9 | 0.9 | 0.9 | 0.9 | 0.9 | 0.9 | 0.9 |
| B$_2$O$_3$ | — | — | — | — | 0.6 | — | — | — | — | — |
| T-Fe$_2$O$_3$ | 2.2 | 2.2 | 1.9 | 1.8 | 1.3 | 1.3 | 1.5 | 1.4 | 1.3 | 1.3 |
| FeO/T-Fe$_2$O$_3$ | 0.34 | 0.30 | 0.24 | 0.22 | 0.31 | 0.28 | 0.29 | 0.30 | 0.40 | 0.23 |
| CeO$_2$ | — | — | — | — | — | — | — | — | 1 | — |
| TiO$_2$ | 0.03 | 0.03 | 0.03 | 0.03 | 0.5 | 0.5 | 0.5 | 1.6 | 0.03 | 0.03 |
| Se(ppm) | — | — | — | — | — | 5 | — | 2 | — | — |
| CoO(ppm) | 98 | 100 | 90 | 92 | 130 | 95 | 75 | 115 | 75 | 110 |
| NiO(ppm) | 300 | 300 | 50 | 100 | 300 | — | 500 | — | 500 | — |
| others |  |  |  |  |  |  |  |  |  | CuO 0.22 |
| YA | 23.0 | 23.2 | 35.6 | 31.7 | 31.9 | 38.0 | 30.4 | 28.0 | 30.4 | 43.9 |
| TG | 10.2 | 11.1 | 19.3 | 21.8 | 20.5 | 23.2 | 15.4 | 16.1 | 15.4 | 28.1 |
| Tuv(ISO) | 0.9 | 1.0 | 1.9 | 2.6 | 4.0 | 3.7 | 3.9 | 1.6 | 3.9 | 3.8 |
| dominant wavelength Dw | 511 | 517 | 499 | 500 | 497 | 516 | 520 | 525 | 514 | 492 |
| excitation purity Pe | 7.3 | 6.6 | 7.4 | 6.6 | 7.5 | 4.1 | 8.3 | 9.8 | 8.3 | 9.6 |

TABLE 3

|  | Example | | | | | | | |
|---|---|---|---|---|---|---|---|---|
|  | 22 | 23 | 24 | 25 | 26 | 27 | 28 | 29 |
| SiO$_2$ | 71 | 71 | 71 | 70 | 71 | 71 | 71 | 71 |
| Al$_2$O$_3$ | 1.6 | 1.6 | 1.6 | 1.6 | 1.6 | 1.6 | 1.6 | 1.6 |
| MgO | 3.6 | 3.6 | 3.6 | 3.6 | 3.6 | 3.6 | 3.6 | 3.6 |
| CaO | 7.7 | 7.7 | 7.7 | 7.7 | 7.7 | 7.7 | 7.7 | 7.7 |
| Na$_2$O | 13.7 | 13.7 | 13.7 | 13.7 | 13.7 | 13.7 | 13.7 | 13.7 |
| K$_2$O | 0.9 | 0.9 | 0.9 | 0.9 | 0.9 | 0.9 | 0.9 | 0.9 |
| B$_2$O$_3$ | — | — | — | — | — | — | — | — |
| T-Fe$_2$O$_3$ | 1.2 | 1.4 | 1.7 | 1.3 | 1.3 | 1.4 | 1.3 | 1.3 |
| FeO/T-Fe$_2$O$_3$ | 0.24 | 0.21 | 0.19 | 0.19 | 0.16 | 0.17 | 0.17 | 0.17 |
| CeO$_2$ | — | — | — | 0.4 | — | — | — | — |
| TiO$_2$ | 0.03 | 0.03 | 0.03 | 0.03 | 0.50 | 0.03 | 0.03 | 0.03 |
| Se(ppm) | 3 | — | — | — | — | — | — | — |
| CoO(ppm) | 110 | 130 | 100 | 120 | 300 | 80 | 180 | 200 |
| NiO(ppm) | — | 390 | 250 | 300 | 600 | 1900 | 1050 | 1000 |
| YA | 37.9 | 35.4 | 37.4 | 38.3 | 18.7 | 17.7 | 20.2 | 19.9 |
| TG | 21.2 | 28.4 | 24.6 | 29.8 | 25.2 | 21.8 | 21.1 | 23.2 |
| Tuv(ISO) | 5.6 | 8.3 | 2.6 | 3.6 | 4.9 | 8.1 | 6.4 | 6.8 |
| dominant wavelength Dw | 496 | 496 | 510 | 499 | 485 | 565 | 555 | 543 |
| excitation purity Pe | 5.9 | 6 | 4.7 | 5.3 | 16.1 | 22.9 | 9.7 | 5.9 |

TABLE 4

| | Example | | | | | | | | | | | |
|---|---|---|---|---|---|---|---|---|---|---|---|---|
| | 30 | | 31 | | 32 | | 33 | | 34 | | 35 | |
| $SiO_2$ | 71 | | 71 | | 71 | | 71 | | 71 | | 71 | |
| $Al_2O_3$ | 1.6 | | 1.6 | | 1.6 | | 1.6 | | 1.6 | | 1.6 | |
| MgO | 3.6 | | 3.6 | | 3.6 | | 3.6 | | 3.6 | | 3.6 | |
| CaO | 7.7 | | 7.7 | | 7.7 | | 7.7 | | 7.7 | | 7.7 | |
| $Na_2O$ | 13.7 | | 13.7 | | 13.7 | | 13.7 | | 13.7 | | 13.7 | |
| $K_2O$ | 0.9 | | 0.9 | | 0.9 | | 0.9 | | 0.9 | | 0.9 | |
| $B_2O_3$ | — | | — | | — | | — | | — | | — | |
| NiO(ppm) | 330 | | 330 | | 330 | | 1000 | | 1000 | | 900 | |
| Se(ppm) | — | | — | | — | | — | | — | | — | |
| CoO(ppm) | 120 | | 125 | | 120 | | 190 | | 180 | | 190 | |
| $TiO_2$ | 0.03 | | 0.03 | | 0.03 | | 0.03 | | 0.03 | | 0.03 | |
| $t-Fe_2O_3$ | 1.3 | | 1.3 | | 1.3 | | 1.3 | | 1.3 | | 1.3 | |
| $FeO/T-Fe_2O$ | 0.17 | | 0.17 | | 0.17 | | 0.16 | | 0.18 | | 0.19 | |
| | before | after | before | after | before | after | before | after | before | after | before | after |
| YA | 38.8 | 37.4 | 37.2 | 35.9 | 37.8 | 36.3 | 20.2 | 17.8 | 20.2 | 17.7 | 20.4 | 18.1 |
| TG | 31.4 | 31.2 | 30.5 | 30.5 | 30.3 | 29.9 | 21.7 | 21.2 | 20.3 | 19.7 | 19.8 | 19.3 |
| L* | 69.50 | 68.38 | 68.37 | 67.25 | 68.79 | 67.59 | 52.54 | 49.63 | 52.63 | 49.54 | 53.01 | 50.27 |
| a* | −9.47 | −8.31 | −9.45 | −8.32 | −9.48 | −8.36 | −9.10 | −6.27 | −9.39 | −6.25 | −9.64 | −6.76 |
| b* | 0.78 | 0.59 | 0.14 | 0.01 | −0.31 | −0.34 | 6.72 | 3.77 | 6.19 | 2.96 | 3.39 | 0.69 |
| dominant wavelength Dw | 498.9 | 498.5 | 496.9 | 496.5 | 495.8 | 495.5 | 550.3 | 542.4 | 545.9 | 529.1 | 514.9 | 499.5 |
| excitation purity Pe | 4.89 | 4.43 | 5.56 | 5.08 | 5.99 | 5.42 | 8.16 | 4.46 | 7.22 | 3.28 | 4.10 | 4.36 |
| Tuv(ISO) | 6.73 | 5.06 | 6.35 | 4.73 | 6.99 | 5.14 | 5.86 | 4.18 | 6.78 | 4.84 | 6.56 | 4.74 |

TABLE 5

| | Comparative Example | | | |
|---|---|---|---|---|
| | 1 | 2 | 3 | 4 |
| $SiO_2$ | 71 | 71 | 72 | 66 |
| $Al_2O_3$ | 1.6 | 1.6 | 1.7 | 3.1 |
| MgO | 3.6 | 3.6 | 4.1 | 3.1 |
| CaO | 8.4 | 8.4 | 7.8 | 7.9 |
| $Na_2O$ | 13.1 | 13.1 | 13.5 | 17.8 |
| $K_2O$ | 0.9 | 0.9 | 0.5 | — |
| $B_2O_3$ | — | — | — | — |
| $T-Fe_2O_3$ | 1.4 | 1.0 | 1.4 | 1.5 |
| $FeO/T-Fe_2O_2$ | 0.61 | 0.21 | 0.17 | 0.18 |
| $CeO_2$ | — | — | — | — |
| $TiO_2$ | 0.03 | 0.03 | 0.1 | — |
| Se (ppm) | — | — | 43 | 40 |
| CoO (ppm) | 135 | 150 | 235 | 213 |
| NiO | 2200 | 300 | — | — |
| thickness (mm) | 4 | 4 | 5 | 3.9 |
| YA | 12.6 | 40.0 | 17.1 | 15.6 |
| TG | 7.2 | 33.1 | 16.6 | 16.7 |
| Tuv(ISO) | 8.8 | 21.7 | 2.5 | 4.7 |
| dominant wavelength Dw | 587 | 483 | 530 | 576 |
| excitation purity Pe | 18.0 | 20.5 | 3.9 | 8.9 |

TABLE 6

| | Example | | Comparative Example 5 |
|---|---|---|---|
| | Example 36 | Example 37 | |
| $SiO_2$ | 71 | 71 | 71 |
| $Al_2O_3$ | 1.6 | 1.6 | 1.6 |
| MgO | 3.6 | 3.6 | 3.6 |
| CaO | 7.7 | 7.7 | 7.7 |
| $NA_2O$ | 13.7 | 13.7 | 13.7 |
| $K_2O$ | 0.9 | 0.9 | 0.9 |
| $B_2O_3$ | — | — | — |

TABLE 6-continued

| | Example | | Comparative Example 5 |
|---|---|---|---|
| | Example 36 | Example 37 | |
| NiO (ppm) | 770 | 770 | 770 |
| Se (ppm) | 0 | 1 | 2.1 |
| CoO (ppm) | 180 | 180 | 180 |
| $TiO_2$ | 0.03 | 0.03 | 0.03 |
| $t-Fe_2O_3$ | 1.26 | 1.26 | 1.26 |
| $FeO/T-Fe_2O$ | 0.216 | 0.214 | 0.209 |
| YA | 21.8 | 21.4 | 20.5 |
| TG | 18.6 | 18.6 | 18.5 |
| L* | 54.6 | 54.1 | 53.1 |
| a* | −8.8 | −8.5 | −7.8 |
| b* | −0.0 | 0.9 | 1.2 |
| dominant wavelength Dw | 496.4 | 499.6 | 501.8 |
| excitation purity Pe | 6.38 | 5.16 | 4.37 |

TABLE 7

| | Example | | | | |
|---|---|---|---|---|---|
| | 38 | 39 | 40 | 41 | 42 |
| SiO2 | 70.5 | 70.5 | 70.5 | 70.5 | 70.5 |
| Al2O3 | 1.6 | 1.6 | 1.6 | 1.6 | 1.6 |
| CaO | 8.0 | 8.0 | 8.0 | 8.0 | 8.0 |
| MgO | 3.7 | 3.7 | 3.7 | 3.7 | 3.7 |
| Na2O | 13.9 | 13.9 | 13.9 | 13.9 | 13.9 |
| K2O | 0.8 | 0.8 | 0.8 | 0.8 | 0.8 |
| T-Fe2O3 | 1.25 | 1.3 | 1.25 | 1.27 | 1.4 |
| FeO/T-Fe2O3 | 0.23 | 0.18 | 0.23 | 0.23 | 0.21 |
| TiO2 | 0.03 | 0.03 | 0.02 | 0.03 | 0.06 |
| Se (ppm) | <1 | — | — | — | — |
| CoO (ppm) | 110 | 120 | 170 | 130 | 130 |
| NiO (ppm) | 310 | 300 | 450 | 280 | 330 |

TABLE 7-continued

| | Example | | | | |
|---|---|---|---|---|---|
| | 38 | 39 | 40 | 41 | 42 |
| | before | after | | | | |
| YA (%) | 37.3 | 35.0 | 38.4 | 30.1 | 30.7 | 34.3 |
| TG (%) | 26.6 | 25.5 | 30.1 | 26.5 | 26.1 | 24.3 |
| Tuv(iso) (%) | 10.1 | 7.6 | 6.8 | 8.2 | 7.2 | 5.6 |
| L* | 67.57 | 66.66 | 85.56 | 62.82 | 68.03 | 66.33 |
| a* | −9.33 | −8.65 | −9.73 | −7.53 | −10.63 | −11.3 |
| b* | −1.3 | −1.34 | −0.33 | −2.52 | −3.12 | −0.59 |
| Dw(nm) | 493.6 | 493.3 | 495.7 | 490.9 | 491.2 | 495.3 |
| Pe(%) | 6.9 | 6.7 | 6.13 | 8.87 | 9.61 | 7.57 |

TABLE 8

| | ① | ② | ③ | ④ | ⑤ |
|---|---|---|---|---|---|
| SiO2 | 71.6 | 71.6 | 71.6 | 71 | 71 |
| Al2O3 | 1.7 | 1.7 | 1.7 | 1.7 | 1.7 |
| CaO | 8.6 | 8.6 | 8.2 | 8.2 | 7.6 |
| MgO | 2.1 | 2.1 | 2.5 | 2.5 | 3.0 |
| Na2O | 13.6 | 13.6 | 13.6 | 13.6 | 13.6 |
| K2O | 0.9 | 0.9 | 0.9 | 0.9 | 0.9 |
| t-Fe2O3 | 1.3 | 1.3 | 1.25 | 1.25 | 1.3 |
| FeO/t-Fe2O3 | 0.25 | 0.16 | 0.17 | 0.24 | 0.17 |
| TiO2 | 0.03 | 0.03 | 0.03 | 0.03 | 0.7 |
| CeO2 | 0 | 0 | 0 | 0.5 | 0 |
| Se | — | — | — | — | — |
| CoO | 0.01 | 0.012 | 0.008 | 0.012 | 0.017 |
| NiO | 0.028 | 0.03 | 0.028 | 0.03 | 0.033 |
| YA(%) | 35.6 | 38.4 | 44.7 | 35.9 | 30.5 |
| TG(%) | 23.0 | 30.1 | 32.5 | 23.5 | 25.4 |
| Tuv(ISO)(%) | 8.0 | 6.8 | 7.5 | 3.8 | 3.7 |
| L* | 67.08 | 69.31 | 73.48 | 67.72 | 63.14 |
| a* | −9.65 | −9.73 | −9.92 | −12.17 | −9.77 |
| b* | −1.42 | −0.33 | 3.47 | −0.99 | −1.77 |
| DW(nm) | 495 | 496 | 515 | 495 | 493 |
| Pe(%) | 6.8 | 6.1 | 3.2 | 8.4 | 8.2 |

What is claimed is:

1. An ultraviolet/infrared absorbent low transmittance glass consisting of base glass comprising:
   65 to 80 wt. % $SiO_2$;
   0 to 5 wt. % $Al_2O_3$;
   greater than 2.1 to less than or equal to 10 wt. % MgO;
   5 to 15 wt. % CaO wherein a total amount of MgO and CaO is 7 to 15 wt. %;
   10 to 18 wt. % $Na_2O$;
   0 to 5 wt. % $K_2O$ wherein a total amount of $Na_2O$ and $K_2O$ is 10 to 20 wt. %; and
   0 to 5 wt. % $B_2O_3$,
and colorants comprising:
   1.25 to 2.2 wt. % total iron oxide (T-$Fe_2O_3$) expressed as $Fe_2O_3$;
   0.001 to 0.018 wt. % CoO;
   0 to 0.0004 wt. % Se; and
   0.028 to 0.2 wt. % NiO, wherein said glass has a turquoise blue or deep green color.

2. An ultraviolet/infrared absorbent low transmittance glass as claimed in claim 1, wherein T-$Fe_2O_3$ is equal to or greater than 1.25 wt. % and less than 1.8 wt. %.

3. An ultraviolet/infrared absorbent low transmittance glass as claimed in claim 1, wherein T-$Fe_2O_3$ is between 1.8 wt. % and 2.2 wt. %.

4. An ultraviolet/infrared absorbent low transmittance glass as claimed in claim 1, wherein Se is less than 0.0002 wt. %.

5. An ultraviolet/infrared absorbent low transmittance glass as claimed in claim 1, wherein Se is less than 0.0001 wt. %.

6. An ultraviolet/infrared absorbent low transmittance glass as claimed in claim 1, wherein NiO is equal to or greater than 0.028 wt. % and less than 0.05 wt. %.

7. An ultraviolet/infrared absorbent low transmittance glass as claimed in claim 1, wherein NiO is between 0.05 wt. % to 0.2 wt. %.

8. An ultraviolet/infrared absorbent low transmittance glass as claimed in claim 1, wherein said colorant further comprises $CeO_2$ in an amount of no greater than 2.0 wt. % and/or $TiO_2$ in an amount of no greater than 2.0 wt. %.

9. An ultraviolet/infrared absorbent low transmittance glass as claimed in claim 1, wherein the amount of FeO calculated as T-$Fe_2O_3$ is in the range from 15 to 40% of T-$Fe_2O_3$.

10. An ultraviolet/infrared absorbent low transmittance glass as claimed in claim 1, wherein the glass with a thickness of 4 mm has a total solar energy transmittance (TG) smaller than a visible light transmittance (YA) by the C.I.E. illuminant A, and YA is in a range from 23% to 50% and TG is in a range from 7% to 35%.

11. An ultraviolet/infrared absorbent low transmittance glass as claimed in claim 10, wherein YA is between 25% and 40% and TG is between 20% to 35%.

12. An ultraviolet/infrared absorbent low transmittance glass as claimed in claim 10, wherein the glass has a color defined by the following CIELAB coordinates −9<a*<−6 and −3<b*<3.

13. An ultraviolet/infrared absorbent low transmittance glass as claimed in claim 1, wherein said glass has an ultraviolet transmittance of no greater than 6%.

14. An ultraviolet/infrared absorbent low transmittance glass as claimed in claim 1, wherein the glass has a dominant wavelength in a range of 480 to 525 nanometers when a measurement is made based on a glass thickness of 4 mm using illuminant C.

15. An ultraviolet/infrared absorbent low transmittance glass as claimed in claim 1, wherein the glass has an excitation purity less than 11% when a measurement is made based on a glass thickness of 4 mm using illuminant C.

16. An ultraviolet/infrared absorbent low transmittance glass as claimed in claim 1, wherein NiO is included in the glass such that the glass has the turquoise blue or deep green color by reinforcement of air blast cooling.

17. An ultraviolet/infrared absorbent low transmittance glass consisting of base glass comprising:
   65 to 80 wt. % $SiO_2$;
   0 to 5 wt. % $Al_2O_3$;
   greater than 2.1 to less than or equal to 10 wt. % MgO;
   5 to 15 wt. % CaO wherein a total amount of MgO and CaO is 7 to 15 wt. %;
   10 to 18 wt. % $Na_2O$;
   0 to 5 wt. % $K_2O$ wherein a total amount of $Na_2O$ and $K_2O$ is 10 to 20 wt. %; and
   0 to 5 wt. % $B_2O_3$,
and colorants without Se comprising:
   1.25 to 2.2 wt. % total iron oxide (T-$Fe_2O_3$) expressed as $Fe_2O_3$;
   0.001 to 0.018 wt. % CoO; and
   0.028 to 0.2 wt. % NiO,
wherein said glass has a turquoise blue or deep green color.

18. An ultraviolet/infrared absorbent low transmittance glass as claimed in claim 17, wherein NiO is included in the glass such that the glass has the turquoise blue or deep green color by the reinforcement of air blast cooling.

19. An ultraviolet/infrared absorbent low transmittance glass as claimed in claim 1, wherein MgO is more than 3.0 wt %.

20. An ultraviolet/infrared absorbent low transmittance glass as claimed in claim 17, wherein MgO is more than 3.0 wt %.

* * * * *